United States Patent Office 3,461,779
Patented Aug. 19, 1969

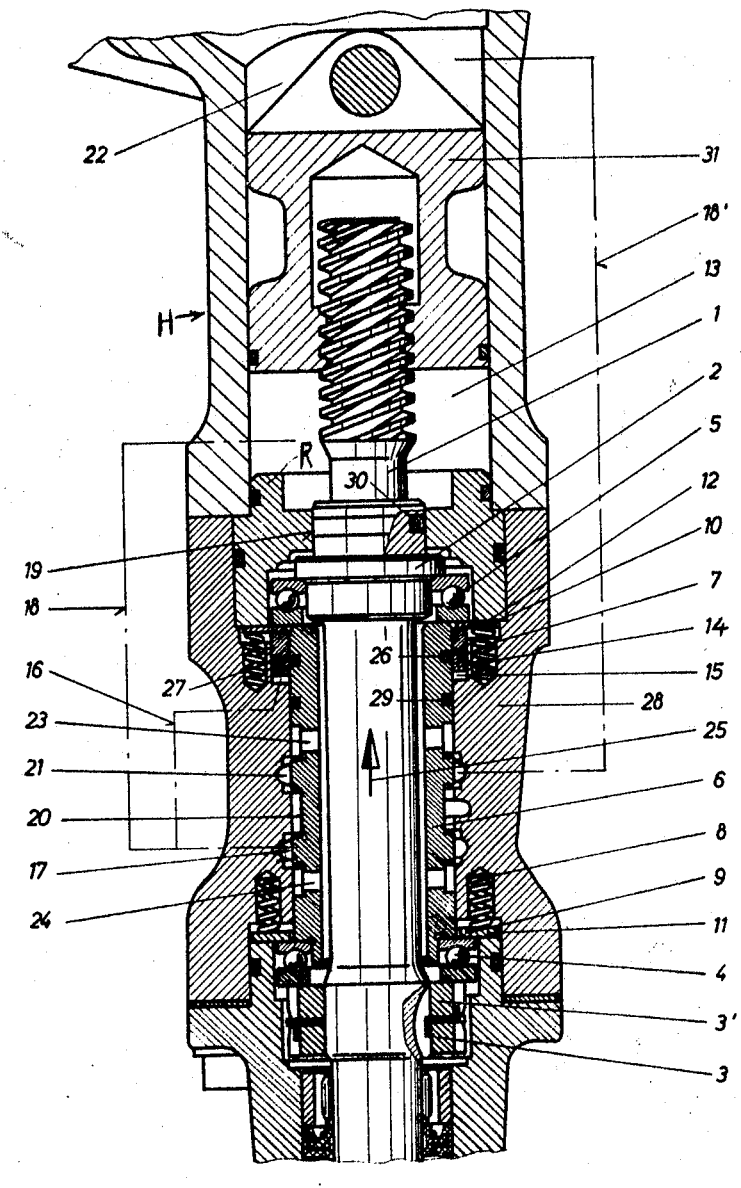

3,461,779
BALANCING OF STEERING SPINDLES IN POWER STEERING SYSTEMS
Erich Jablonsky, Friedrichshafen, Germany, assignor to Zahnradfabrik Friedrichshafen Aktiengesellschaft, a corporation of Germany
Filed Mar. 2, 1967, Ser. No. 619,996
Claims priority, application Germany, Mar. 4, 1966, Z 12,070
Int. Cl. F15b 9/10, 11/08, 13/04
U.S. Cl. 91—372      10 Claims

ABSTRACT OF THE DISCLOSURE

This invention pertains to booster steering systems and more particularly to a hydraulic pressure system using a double-ended cylinder with a slideable piston therein having the steering spindle threaded thereto in the usual manner but wherein a balancing pressure chamber is associated with the spindle in such a manner as to balance the pressure force acting on the spindle due to pressure in the cylinder chamber through which the spindle extends.

Field of the invention

The invention is in the booster steering system field, relating to pressure type booster systems.

Description of the prior art

The prior art known to the inventor relates to spindle balancing as shown in German Utility Patent No. 1,720,-707 wherein the spindle end is subjected to a compensating pressure inside a socket in the pressure piston by virtue of pressure oil feed through an axial bore in the spindle. This effects a balance of pressure force on the spindle but has the drawback that the useful surfaces of the piston are of unequal size and, accordingly, less booster force is exerted in steering in one direction than in the other. Another prior art arrangement is as shown in German Federal Patent 1,140,094 wherein a balancing pressure chamber communicates with either cylinder chamber depending upon the direction of steering. This balancing force acts upon the control value of the hydraulic pressure system and the force is transmitted therefrom to the steering spindle. Such prior art arrangement has the drawback that unless the valve is very carefully designed, it will be forced askew or canted and the elements of the balancing arrangement are somewhat complex as compared with the present invention.

Summary of the invention

The present invention has among its objects the provision of a balancing means for a steering spindle of the type which is surrounded by a sleeve valve wherein resilient elements are utilized to maintain a neutral position of the sleeve valve for straight ahead steering. Thus, such neutralizing or centering arrangements are shown in assignee's U.S. Patents Nos. 3,252,380 and 3,242,824. The improvement in the present instance is to provide an exceedingly simple, rugged and economical arrangement of elements for compensating what would otherwise be an unbalance of pressure force on the steering spindle due to the fact that the spindle passes through one of the pressure chambers and is threadedly received in a socket in the piston, which socket has chamber pressure therein acting on the end face of the spindle. Thus, normally the complete cross-sectional area of the spindle, to the extent that it is exposed to pressure fluid, experiences a force which normally tends to push the spindle out of the cylinder and must be counter-balanced or provided with a reaction support in one way or another. In this instance, the reaction support is provided by a sleeve or collar means slidably and sealingly mounted on the control valve sleeve means which encompasses the spindle. A portion of the spindle housing is provided with a recess, such housing encompassing and forming part of the valve means. The slidable pressure compensating ring or collar is disposed within said recess and is in effect a pressure balancing piston having pressure on its radial end face, which pressure is the oil feed pressure controlled by the valve means and connected via the valve means to the recess or balancing pressure chamber to produce a force in a direction opposite to the direction of the unbalanced force on the spindle. Suitable abutment means is provided so that the compensating ring, at its opposite radial force can effect an abutting force on the spindle acting to balance the booster cylinder pressure force acting on the spindle.

Brief description of the drawing

The single figure of the drawing illustrates a longitudinal cross section of the essential components of the system.

Description of the invention

The invention comprises a pressure cylinder H having opposed pressure chambers 13 and 22 and a slidable piston 31 having a threaded blind bore coacting with the threaded end of a steering spindle 1 in a conventional manner. The steering spindle is encompassed by a valve means such as control valve sleeve 6, which is in turn encompassed by the spindle housing 28 so as to provide a pressure oil feed channel 20 which will be understood to be connected to a source of oil pressure which can be connected to the pressure grooves 17 or 21 wherein groove 17 is connected via tubing 18 to pressure chamber 13 and groove 21 is connected via tubing 18' to pressure chamber 22. The radial bores such as 23 and 24 provide for exhaust from the pressure chambers. The arrangement is fairly conventional as thus far described and it will be apparent that pressure oil will circulate from the feed source to the respective exhausts in the neutral position, as shown on the drawing. Such neutral position is maintained by a plurality of spring such as 7 and 8 within respective bores machines into the housing 28 which act against opposed retainer washers 9 and 10 wherein the washer 10 abuts the radial face 12 of a support collar R which serves as a transition member between the cylinder and the housing. The collar is recessed to accommodate a thrust bearing 5 which further supports the retainer washer 10, and has a necked down passage in which is slidably disposed a portion 19 of the spindle having the seal 30 to prevent leakage from the pressure chamber 13. The bearing 5, at its other side is retained against a flange 2 carried by the spindle.

The housing is provided with a recess 15 which effects a pressure chamber by virtue of being connected via a tube 16 to the pressure groove 17. A slidable compensating ring or piston 14 is slidably and sealingly disposed on the control valve sleeve and it will be understood that one radial face of ring 14 is exposed to pressure feed oil via tube 16 when there is pressure feed in groove 17 to thus receive a force acting via washer 10, bearing 5 and flange 2 on the spindle 1. The ring 14 is suitably sealed as by seal 26 with respect to the valve sleeve and by seal 27 with respect to the annular recess 15, the valve sleeve being further sealed with respect to the housing by seal 29.

The radial area of ring 14 exposed to feed pressure will be understood to be equal to the radial area of the spindle exposed to pressure in chamber 13, this being the area represented by the cross section of the collar 19.

From the description thus far it will be apparent that the construction is quite simple, in that the annular channel or recess 15 may be readily provided in the interior of housing 28 within the confines of the array of springs 7, and by providing equality of areas between exposed portions of ring 14 and spindle 1 the pressure force acting to push the spindle out of the cylinder will be balanced or compensated whenever there is feed pressure in pressure chamber 13. At the right hand end of the control valve is disposed a thrust bearing 4 adjustably retained by coacting adjusting nuts 3 and 3' which are of conventional construction and which serve to maintain a composite assembly of the thrust bearings and the valve sleeve against the flange 2, said nuts being threaded on the spindle.

The valve actuation is effected in the same manner as set forth in the U.S. patents mentioned hereinabove. Thus, initial rotation of the steering spindle effects initial reciprocation of the spindle which causes the valve sleeve to shift axially in a direction dependent on the direction of rotation of the spindle so as to pressurize either cylinder chamber while exhausting the other.

What is claimed is:

1. In a power steering booster mechanism, a piston, means providing pressure chambers on respective sides of said piston, a steering spindle extending through one of said chambers, and operatively connected to said piston and having an end terminating therein in a blind bore, feed pressure means, means for balancing pressure force on said steering spindle comprising a ring encompassing said spindle disposed to exert thrust thereagainst and having a radial area exposed to pressure of said feed pressure means, said radial area of said ring being substantially equal to the area of cross section of said spindle within said chamber to effect equal pressure forces in opposite directions on said spindle, and abutment means on said spindle to transmit axial force from said ring to said spindle.

2. A mechanism as set forth in claim 1, said ring being sealingly and slidably carried encompassing said spindle.

3. A mechanism as set forth in claim 1, and a housing surrounding said spindle and effecting a pressure chamber for said radial area of said ring and being connected for flow communication to said feed pressure means.

4. A mechanism as set forth in claim 1, said ring being sealingly and slidably carried encompassing said spindle, a housing surrounding said spindle and effecting a pressure chamber for said radial area of said ring and being connected for flow communication to said feed pressure means.

5. A mechanism as set forth in claim 4, including means whereby said ring is sealingly and slidably disposed within said housing.

6. A mechanism as set forth in claim 1, and a control valve sleeve encompassing said spindle and being disposed intermediate said ring and said spindle, said ring being slidably supported on said valve sleeve.

7. In a power steering booster mechanism having means providing a pressure chamber and a piston therein with a steering spindle extending through said chamber and operatively connected to said spindle and having feed pressure means, the improvement for balancing pressure force on said steering spindle comprising a ring supported encompassing said spindle and having a radial area, flow communication means whereby said area is exposed to pressure of said feed pressure means, said radial area of said ring being substantially equal to the area of cross section of said spindle exposed to chamber pressure, said areas being disposed so as to effect pressure forces in opposite directions on said spindle, and abutment means on said spindle to transmit axial force from said ring to said spindle, said ring being sealingly and slidably carried encompassing said spindle, said abutment means comprising a flange on said spindle and means comprising a thrust bearing disposed intermediate said ring and said flange.

8. In a power steering booster mechanism having means providing a pressure chamber and a piston therein with a steering spindle extending through said chamber and operatively connected to said spindle and having feed pressure means, the improvement for balancing pressure force on said steering spindle comprising a ring supported encompassing said spindle and having a radial area, flow communication means whereby said area is exposed to pressure of said feed pressure means, said radial area of said ring being substantially equal to the area of cross section of said spindle exposed to chamber pressure, said areas being disposed so as to effect pressure forces in opposite directions on said spindle, and abutment means on said spindle to transmit axial force from said ring to said spindle, and control valve sleeve encompassing said spindle and being disposed intermediate said ring and said spindle, said ring being slidably supported on said valve sleeve, and means for maintaining said valve sleeve axially fixed with respect to said spindle.

9. In a power steering booster mechanism having means providing a pressure chamber and a piston therein with a steering spindle extending through said chamber and operatively connected to said spindle and having feed pressure means, the improvement for balancing pressure force on said steering spindle comprising a ring supported encompassing said spindle and having a radial area, flow communication means whereby said area is exposed to pressure of said feed pressure means, said radial area of said ring being substantially equal to the area of cross section of said spindle exposed to chamber pressure, said areas being disposed so as to effect pressure forces in opposite directions on said spindle, and abutment means on said spindle to transmit axial force from said ring to said spindle, a valve sleeve encompassing said spindle, means for axially fixing said valve sleeve on said spindle comprising a pair of thrust bearings disposed at opposite ends of said valve sleeve and abutting therewith, means comprising said abutment means retaining said bearings axially fixed on said spindle, said ring being slidably supported on said valve sleeve and disposed to transmit force to one of said bearings to be transmitted therefrom to said abutment means.

10. A mechanism as set forth in claim 9, including retainer washers disposed at respective ends of said valve sleeve, one of said washers having a face contiguous with a face of said ring and an opposite face contiguous with said last-named bearing, a resilient means disposed to act against said spindle in opposite directions to effect centering of said spindle and comprising springs having ends abutting said last-named retainer washer.

References Cited

UNITED STATES PATENTS

| 2,213,271 | 9/1940 | Davis | 91—373 |
| 2,862,523 | 12/1958 | Obermaier | 91—372 |

FOREIGN PATENTS

| 1,307,867 | 9/1962 | France. |

PAUL E. MASLOUSKY, Primary Examiner

U.S. Cl. X.R.

91—380, 466; 92—136